(12) United States Patent
Mohan

(10) Patent No.: US 6,956,523 B2
(45) Date of Patent: Oct. 18, 2005

(54) METHOD AND APPARATUS FOR REMOTELY DERIVING THE VELOCITY VECTOR OF AN IN-FLIGHT BALLISTIC PROJECTILE

(75) Inventor: Paul Mohan, Novi, MI (US)

(73) Assignee: Veridian Systems, Ann Arbor, MI (US)

( * ) Notice: Subject to any disclaimer, the term of this patent is extended or adjusted under 35 U.S.C. 154(b) by 156 days.

(21) Appl. No.: 10/462,525

(22) Filed: Jun. 16, 2003

(65) Prior Publication Data

US 2005/0012657 A1 Jan. 20, 2005

(51) Int. Cl.$^7$ .......... G01S 13/06; G01S 13/32; G01S 13/66

(52) U.S. Cl. .......... 342/133; 342/52; 342/54; 342/59; 342/104; 342/107; 342/128; 342/147; 342/195; 342/450; 342/451; 342/463; 342/464; 342/465

(58) Field of Search ............ 342/89–103, 146–158, 342/450–465, 27, 28, 59, 52–58, 61–68, 104–107, 118, 128, 129–133, 175, 195

(56) References Cited

U.S. PATENT DOCUMENTS

| | | | |
|---|---|---|---|
| 4,030,097 A | | 6/1977 | Gedeon |
| 5,140,329 A | * | 8/1992 | Maughan et al. ............ 342/67 |
| 5,241,518 A | | 8/1993 | McNelis et al. ............ 367/127 |
| 5,631,654 A | * | 5/1997 | Karr ............ 342/107 |
| 5,781,505 A | | 7/1998 | Rowland ............ 367/127 |
| 5,796,474 A | | 8/1998 | Squire et al. |
| 6,029,558 A | | 2/2000 | Stevens et al. |
| 6,057,915 A | | 5/2000 | Squire et al. |
| 6,188,469 B1 | | 2/2001 | Liou et al. |
| 6,279,449 B1 | | 8/2001 | Ladika et al. |
| 6,412,391 B1 | | 7/2002 | Stevens et al. |
| 2002/0152881 A1 | | 10/2002 | Stevens et al. |
| 2002/0162391 A1 | | 11/2002 | Dilz, Jr. |

* cited by examiner

*Primary Examiner*—Bernarr E. Gregory
(74) *Attorney, Agent, or Firm*—Gifford, Krass, Groh, Sprinkle, Anderson & Citkowski, PC

(57) ABSTRACT

A system and method for rapidly determining the source of an incoming projectile applies controlled, active RF energy source(s) to illuminate a target area/projectile, and exploits Doppler induced frequency shifts from multiple receivers to develop a vector solution. The preferred solution applies continuous wave (CW) RF illuminators to flood a local region with a controlled source of radio frequency energy and one or more displaced receiver elements. The system operates multi-statically and as an incoming projectile enters the illuminated region, reflected energy from one or more illuminators is detected by one or more displaced RF receivers. Doppler shifts imparted on the reflected signals are detected by the receivers as the projectile moves through the region. Appropriate processing of the receiver outputs generates Doppler time-frequency profiles that are used to derive an estimate of the projectile flight vector in 3-space (x,y,z). The vector parameters can, among other things, feed a laser designator that projects a beam along the derived flight path to support identification of the source, or be relayed to remote personnel by a data link where the projectile vector can be displayed on a map.

39 Claims, 5 Drawing Sheets

FCC Limits for maximum permissible exposure (MPE), freq. > 1.5 GHz
A) Occupational/controlled exposure: 5mw/cm$^2$
B) General population/uncontrolled exposure: 1m W/cm$^2$ ND APPARATUS FOR REMOTELY DERIVING THE VELOCITY VECTOR OF AN IN-FLIGHT BALLISTIC PROJECTILE

FIELD OF THE INVENTION

This invention relates generally to ballistic tracking systems and, in particular, to apparatus and methods used to remotely derive the in-flight velocity vector of incoming gunfire to support rapid location of the source.

BACKGROUND OF THE INVENTION

With the proliferation of small arms and global terror, the need for ballistic countermeasures has become increasingly acute. Several alternate approaches to solving the projectile detecting and/or tracking problem have been developed. Most employ acoustic or electro-optic (EO) sensors to solve for the trajectory vector.

Squire describes a system that uses an infrared camera to first detect a bullet via its thermal signature and then switches to a tracking mode using a laser radar. Back projection algorithms are then used to derive the projectile velocity vector.

Rowland describes a system that applies acoustic or optical sensors to determine the trajectory and source of the projectile. These types of systems exploit the amplitudes and arrival times of the so called N-wave (the acoustic signature of a supersonic projectile) at known sensor positions that varies as functions of the distance or range to the trajectory of the projectile.

McNelis presents an alternate acoustic apparatus for determining the trajectory of a supersonic projectile of unknown velocity and direction. In this apparatus, at least three displaced sensors are capable of encountering a shock wave generated by a supersonic projectile passing in the vicinity of the sensors. The sensors generate signals in response to the shock wave that are related to an azimuth and elevation angle of a unit sighting vector from each sensor to an origin of the shock wave.

Systems have also been proposed that rely on radar. The patents to Stevens, et al., which include U.S. Pat. Nos. 6,029,558 and 6,412,391, reside in a counter-terrorism, reactive personnel protection system which detects the presence of a concussive shock wave or ballistic projectile as it approaches a designated personnel target. Before impact, an air bag is rapidly inflated and interposed between the destructive force and the target so as to provide a protective barrier. The air bag is constructed from ultra-high molecular weight polyethylene material, and serves to halt or redirect the detected destructive force and thereby protect the designated target from attack.

In the case of projectile detection and protection, the Stevens' patents propose a radar-based bullet detection system with anti-jamming electronics is used to detect the presence of an incoming small arms projectile and determine its path of travel. A bi-static radar system is used to detect the Doppler shift signature to reliably determine the presence of a bullet, and discriminate between the bullet and any other rapidly moving object in the vicinity. Additionally, signal processing circuitry and algorithms are used to help differentiate between projectiles and noise or other extraneous signals to prevent false alarms. Once the presence of a ballistic object is confirmed, a control unit activates a gas generation device, which in turn rapidly inflates an anti-ballistic air bag.

SUMMARY OF THE INVENTION

This invention provides military personnel or local law enforcement with a system and method for rapidly determining the source of incoming gunfire, including real-time operation. Broadly the system applies controlled, active RF energy source(s) to illuminate a target area/projectile, and exploits Doppler induced frequency shifts from multiple receivers to develop a vector solution.

The preferred method applies continuous wave (CW) RF illuminators to flood a local region with a controlled source of radio frequency energy and one or more displaced receiver elements. The system operates multi-statically such that as an incoming projectile enters the illuminated region, reflected energy is detected by two or more of the RF receivers.

Doppler shifts imparted on the reflected signals are detected by the receivers as the projectile moves through the region. Appropriate processing of the receiver outputs generates Doppler time-frequency profiles that are used to derive an estimate of the projectile flight vector in 3-space (x,y,z).

The vector parameters can, among other things, feed a laser designator that projects a beam along the derived flight path to support localization of the source of the projectile, or be relayed to remote personnel by a data link where the projectile vector can be displayed on a map.

In comparison to other approaches, the invention offers the ability to control the illumination parameters (beamwidth, power level, frequency, waveform, polarization, source locations) to enhance performance (operating range, probability of detection, accuracy) over a wide range of operational situations. No mechanical tracking is needed, as required by some prior approaches. The system is capable of tracking through foliage and certain types of obstacles such as wood or masonry buildings. In comparison to acoustic systems, the invention affords a greater ability to discriminate an event of interest from background noise or "confusing" signatures (car backfire, thunder). The system and method are potentially lower in cost as compared to more complex electro-optical (EO)/mechanical systems

DETAILED DESCRIPTION OF THE INVENTION

Figure 1:
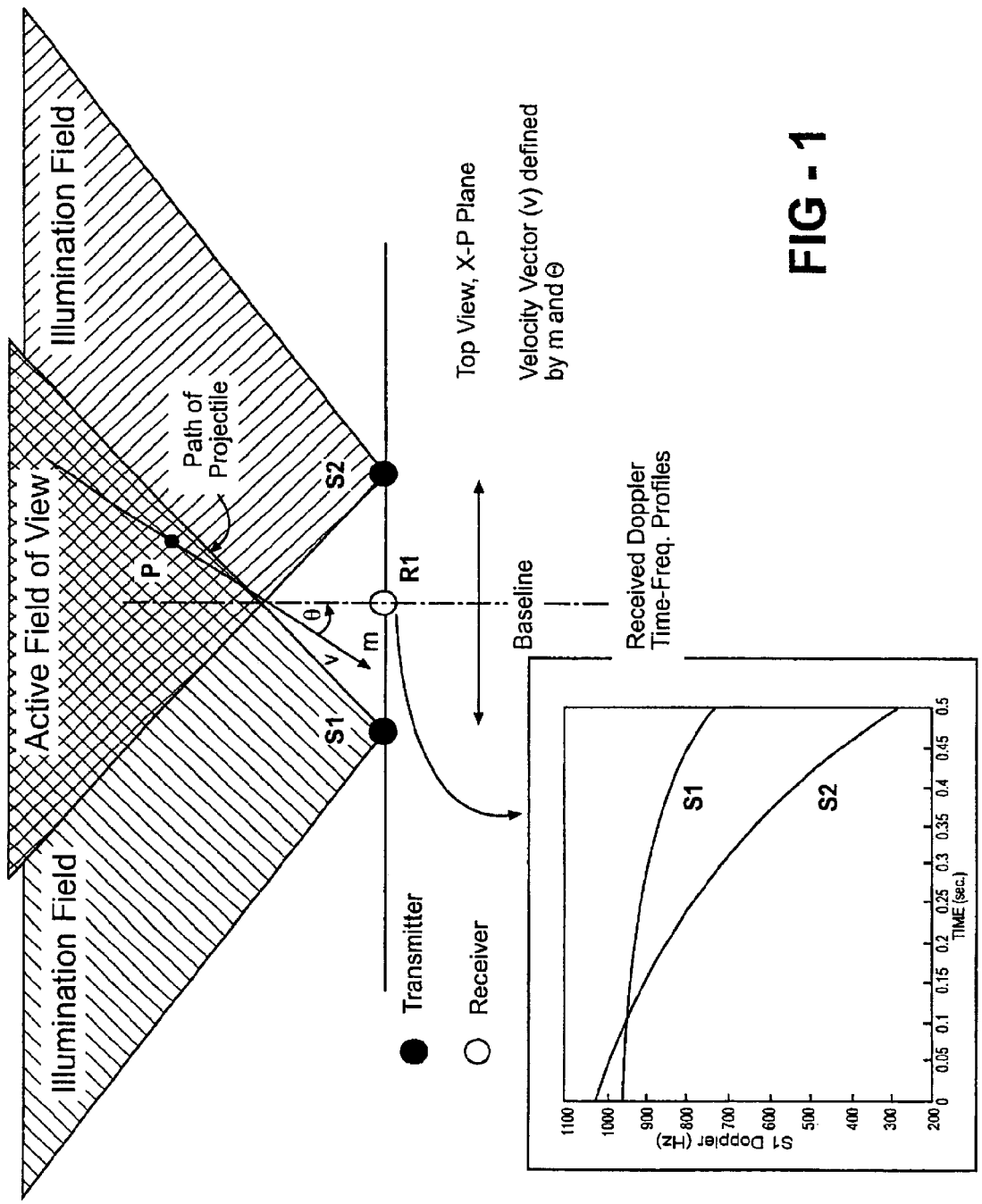
FIG. 1 illustrates one typical configuration using the invention.

FIG. 1 illustrates one typical configuration using the disclosed approach. This example treats the problem in a 2D, x-y plane though it can be extended to three dimensions. Shown are two illuminators, S1 and S2, and a single receiver R1. Typical representations of the received Doppler time-frequency profiles associated with the passage of a projectile (P) are also shown. The transmitters typically operate in a CW mode to support long integration times and improve accuracy. The operating frequencies of the transmitters are typically offset from one and other to simplify RF isolation as well as downstream processing. The system operates in a multi-static configuration in which multiple receivers and/or transmitters are physically separated. The objective of the system (in this 2D case) is to derive good estimates of the projectile vector parameters (m) and (θ). A further goal is to derive an estimate of the magnitude (v) of the velocity vector for projectile (P). The example configuration shown in FIG. 1 might be used when the target projectile scatters the illumination uniformly over some angle. Other configurations and combinations of transmitters and receivers would be used based on the predicted scatter characteristics of the projectile and the selected operating wavelength. For example, if the target reflections are anticipated to be specular, one might co-locate a transmitter and receiver pair at two complementary locations either side of the centerline. Further, other configurations may apply multiple illuminators and multiple receivers arranged in a more general (i.e., non-collinear) 2D array.

Specific features of the disclosed approach include:

Use of multiple frequency illuminators to improve accuracy of vector estimation and eliminate angle ambiguity CW operation to reduce system complexity and improve probability of detection Processing algorithm that exploits the time history of the Doppler profile to improve signal detectability by applying time integration.

Near real-time execution of the processing algorithm to support immediate response in tactical environments Key issues associated with the general phenomenology associated with the disclosed approach include:

Projectile Flight Profile: For the initial concept analysis, we assume a straight-line velocity vector with constant magnitude. Further refinement can include the effects of air friction and other deterministic effects on the velocity profile of the projectile.

Doppler Bandwidth: By using only narrowband Doppler signatures to derive the velocity vector, the system is able to eliminate energy received from stationary or slow moving clutter. The high relative speed of the target permits this. Further, with the Doppler passband sufficiently far from the carrier frequency, we can support CW operation which is generally less complex and provides continuous monitoring. Any direct path leakage of the transmitter harmonics into the Doppler passband are easily distinguished from the desired spectral features since sidelobe frequency will not change over time.

RCS: A key factor in the detectability of energy from the projectile is its radar cross section (RCS). The RCS of an object (radius r) in the Rayleigh region ($2\pi r/\lambda < 1$) is sensitive to polarization and aspect angle. In the Rayleigh case, the RCS for targets can be approximated[1] as $$\sigma = \frac{4}{\pi}k^4 V^2$$

where $$k = \frac{2\pi}{\lambda}$$

and V is the (approximately spherical) volume. Typical RCS values for a spherically approximated projectile with r=2.5 mm are $4.1 \times 10^{-12}$ @ 250 MHz, $4.1 \times 10^{-8}$ @ 2.5 GHz and $1 \times 10^{-5}$ @ 10 GHz. While these values of σ are quite low by typical radar standards, we note that the maximum operating ranges for this application are typically hundreds of meters versus several tens of km. The shorter range values help maintain received signal power level—proportional to $$\frac{\sigma}{R^4}$$

as given by the two-way radar equation.

[1] Nathanson, Radar Design Principals. 1999, Mc Graw-Hill Inc.

Multi-Path: Spurious reflections of the transmitted signals from metallic (or other) objects within the field of view can also impinge the target and provide detectable returns. These returns will exhibit Doppler characteristics different from those of the desired direct path due to their unique and time varying reflection geometry. Therefore, multipath returns will display a random amplitude modulation over time over some Doppler bandwidth. The Doppler history of multipath returns will also be relatively uncorrelated to those from the direct path. The processing approach used as part of the disclosed method applies time integration to enhance the detectability of the desired direct path returns.

Ambiguities: To avoid angle ambiguities associated with a completely symmetric sensor configuration, it is desirable to specifically introduce left-right asymmetry. One approach is to use RF sources that are offset in frequency. This allows the processor to distinguish between a target entering from the left or the right of the center line.

A brief summary of some of the relevant system design criteria include:

Sensor Configuration: The configuration of transmitters and receivers (number and relative positions) is flexible and would be dictated by, among other things, the predicted scatter properties of the projectile. In addition, redundant measurements provided by multiple receive/transmit pairs with differing view angles can improve tolerance of target fading or other anomalies.

Operating Frequency: To penetrate foliage and, to varying degrees, non-metallic structures, operation in the VHF to lower UHF band is desirable [100–500 MHz]. There is however a trade off in frequency selection because the RCS of the target (metallic, approximately spherical with dimensions $2\pi r/\lambda < 1$) when operating the Rayleigh region is proportional to $\lambda^{-4}$. To increase the RCS, one desires a shorter wavelength. At one extreme, we can maximize the RCS by selecting an operating wavelength that equals the circumference of the equivalent sphere representing the target. Another influence on frequency selection is local interference sources. A general requirement is the ability to select the operating frequencies based on an assessment of the local RF environment.

Polarization: It is known that when a radar transmits a circularly polarized waves, the receive aperture does not respond to the reflections from spherical objects if the transmit and receive polarization is the same. Use of linear polarization, with both transmit and receive operating in the same sense, can provide a good solution.

Figure 2:
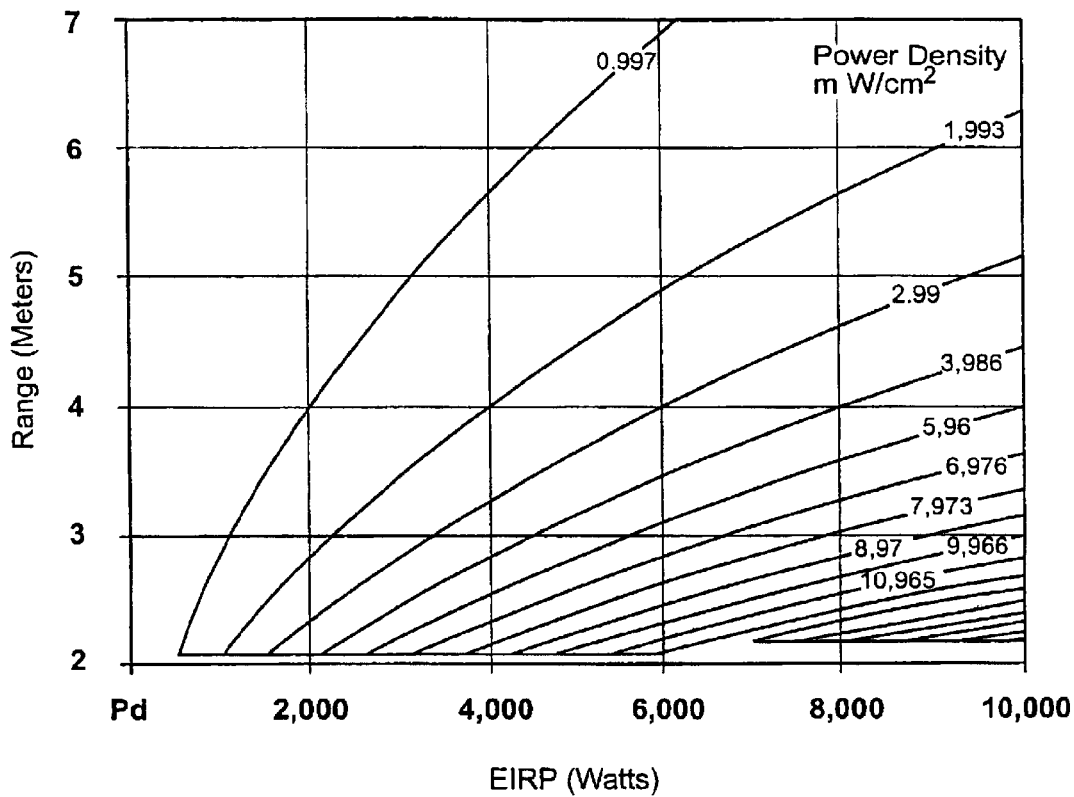
FIG. 2 illustrates RF power level contours for a typical configuration.

Transmit Power: Use of higher transmit powers to improve signal to noise ratio must be balanced by the need to keep power levels within acceptable human exposure limits as well as conforming with FCC regulations for interference. FIG. 2 illustrates a typical contour plot of RF exposure power levels (milliwatts/cm$^2$) versus range for a set of transmitter power levels. The contours labeled A and B show minimum permissible distances between transmitter and personnel for a given Effective Isotropic Radiated Power (EIRP) for frequencies greater than 1.5 GHz.

One notional set of operating parameters applying the disclosed approach might be:

Projectile speed: 750 to 1000 meters/second

Transmit frequency/power: 2000–2500 MHz [λ=15 cm to 12 cm] @<1 kW

Doppler Bandwidth: 7.5 to 12 KHz (fc=2000 MHz)

Baseline length (S1 to S2): 500 meters

Detection range: 100 to 1000 meters

Angular field of view (from centerline): ±45 degrees

Time latency for vector computation: 1 second

Analysis and Algorithm Approach

The basic notion of the vector extraction algorithm is to exploit multiple Doppler time-frequency histories derived from the projectile and, knowing the sensor transmitter/receiver locations, estimate the velocity vector of the incoming projectile. Further, the design and implementation of the algorithm should support rapid execution using standard computing hardware. A particular feature of the algorithm takes advantage of the time history of the Doppler return. This effectively provides an integration period through which the estimation of vector parameters is improved given that, over short time intervals, the Doppler signature will be corrupted by noise and random scattering effects induced by aspect angle variations.

Figure 3:
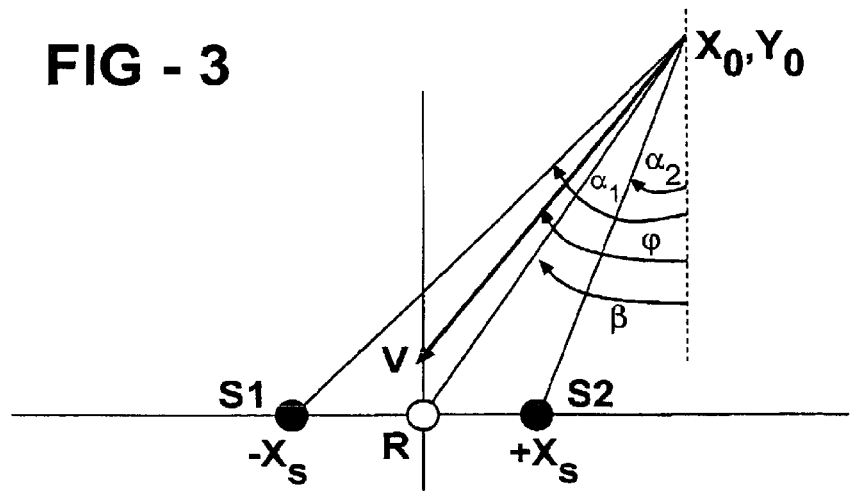
FIG. 3 illustrates the geometry and key parameters for a two transmitter, single receiver configuration.

In FIG. 3 we consider the case of two transmitters, S1 & S2 and a single receiver R. The pertinent aspect angles are indicated in a 2D x,y reference frame. FIG. 4 shows the results of simulating the Doppler surfaces referenced to R for a projectile with fixed entry angle (φ) over a range of x,y locations [X range: −100 m to 600 m; Y range: 100 to 500 meters]. Other simulation parameters are:

Projectile velocity: 756 m/s @φ=20° wrt y-axis fS1=2.0 GHz, fS2=2.05 GHz

X$_s$=50 meters

Figure 4A:
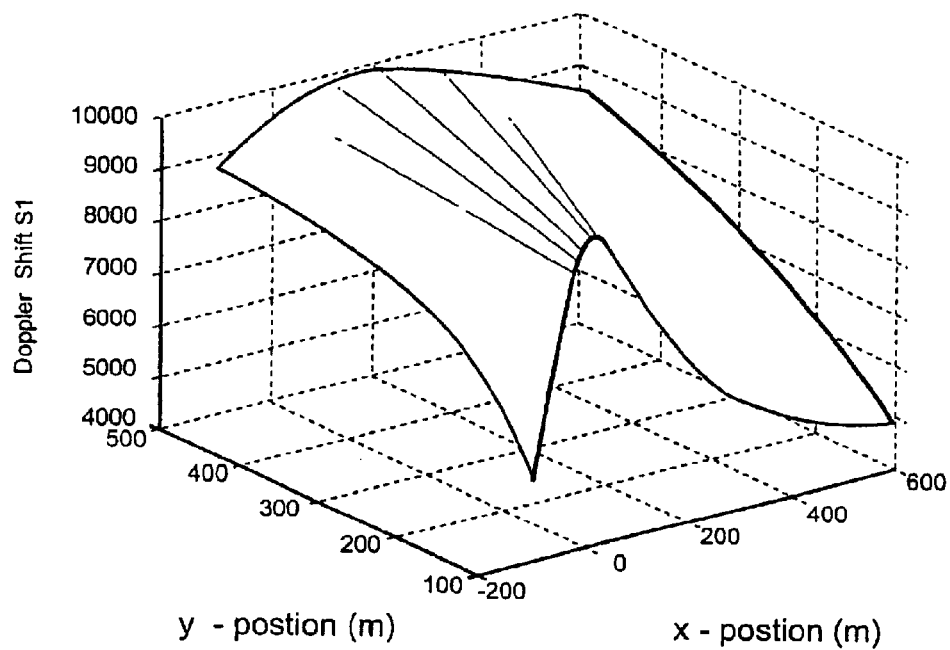
FIGS. 4A and 4B illustrate the time variation of the Doppler received at a receiver from two sources, showing how one may pick some starting (x,y) point on each plot and traverse along the surfaces as the projectile coordinates change with time.
Figure 4B:
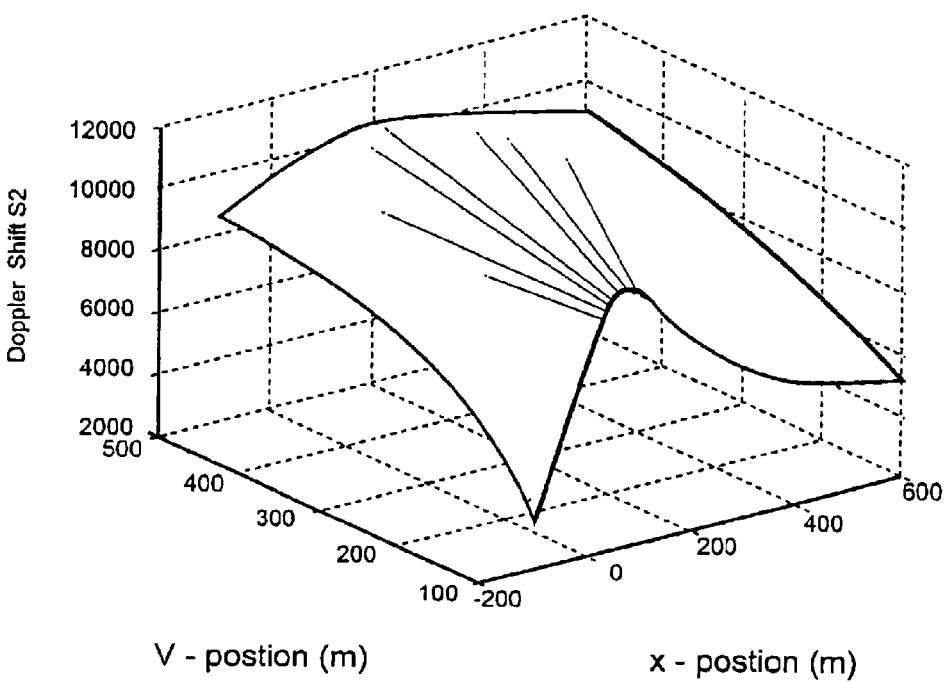

Working with the Doppler surfaces depicted in FIGS. 4A and 4B, one may pick some starting (x,y) point on each plot, and traverse along the surfaces as the projectile coordinates change with time. Note that these particular surfaces are specific to the assumed entry angle for the example (φ=20°). Each entry angle will develop its own set of surfaces.

Figure 5A:
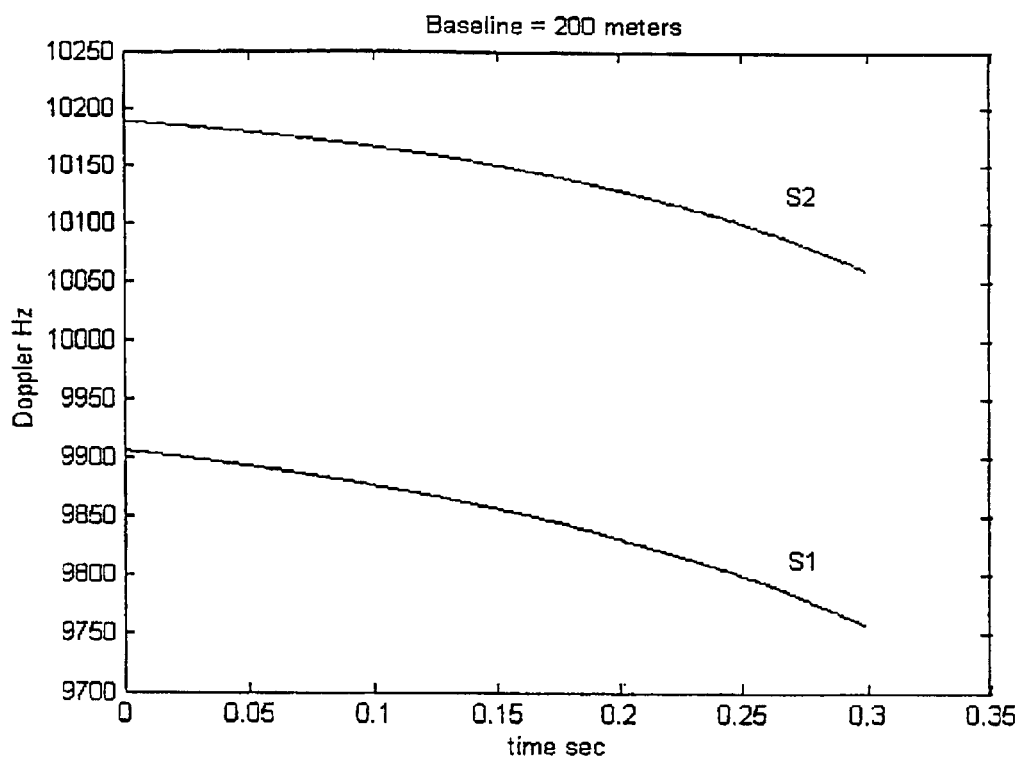
FIGS. 5A and 5B show examples of simulated Doppler frequency-time histories for two different baseline values of 100 m and 200 m.
Figure 5B:
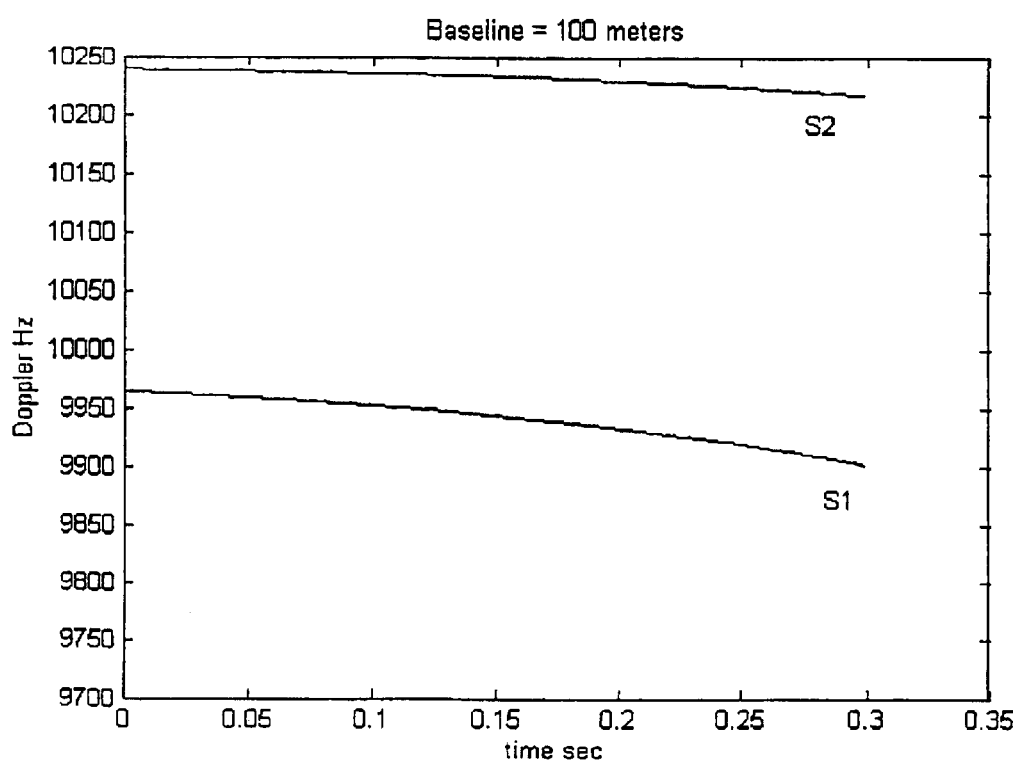

FIGS. 5A and 5B show examples of simulated Doppler frequency-time histories for two different baseline values of 100 m and 200 m. The same target parameters and frequency assignments used previously apply here. We track the Doppler as the target (x,y) position (in meters) moves from (200,500) to (123,289) over a 300 msec time interval. In these plots the Doppler frequency shifts, Δf, induced at the receiver R for each source, S1 and S2, are shown.

Given that we have obtained a set of Doppler histories for a specific projectile, the task becomes that of determining its defining 2D vector parameters (m and θ from FIG. 1). Conceptually, this becomes an attempt to best fit the measured Doppler f-t curves from each source onto the associated Doppler f-xy surfaces (for a given value of v) across the set of possible x,y positions and possible entry angles (φ).

We can convert the Doppler f-t history to a f-xy history by assuming some value for v and φ and computing:

$$\Delta x = v \sin(\phi) \cdot \Delta t$$

$$\Delta y = v \cos(\phi) \cdot \Delta t$$

where Δt is the time interval between Doppler frequency updates. This is then used to attempt a match to the modeled Doppler f-xy surface generated for the selected value of v and φ. Naturally, our search space is bounded since we quantize x, y and φ to a discrete set of values, driven by some accuracy requirement. One can immediately see the value of using more than one signal source (S$_n$) and/or receiver (R$_n$), since each provides a set of independent data on which to estimate the desired vector parameters.

Figure 6:
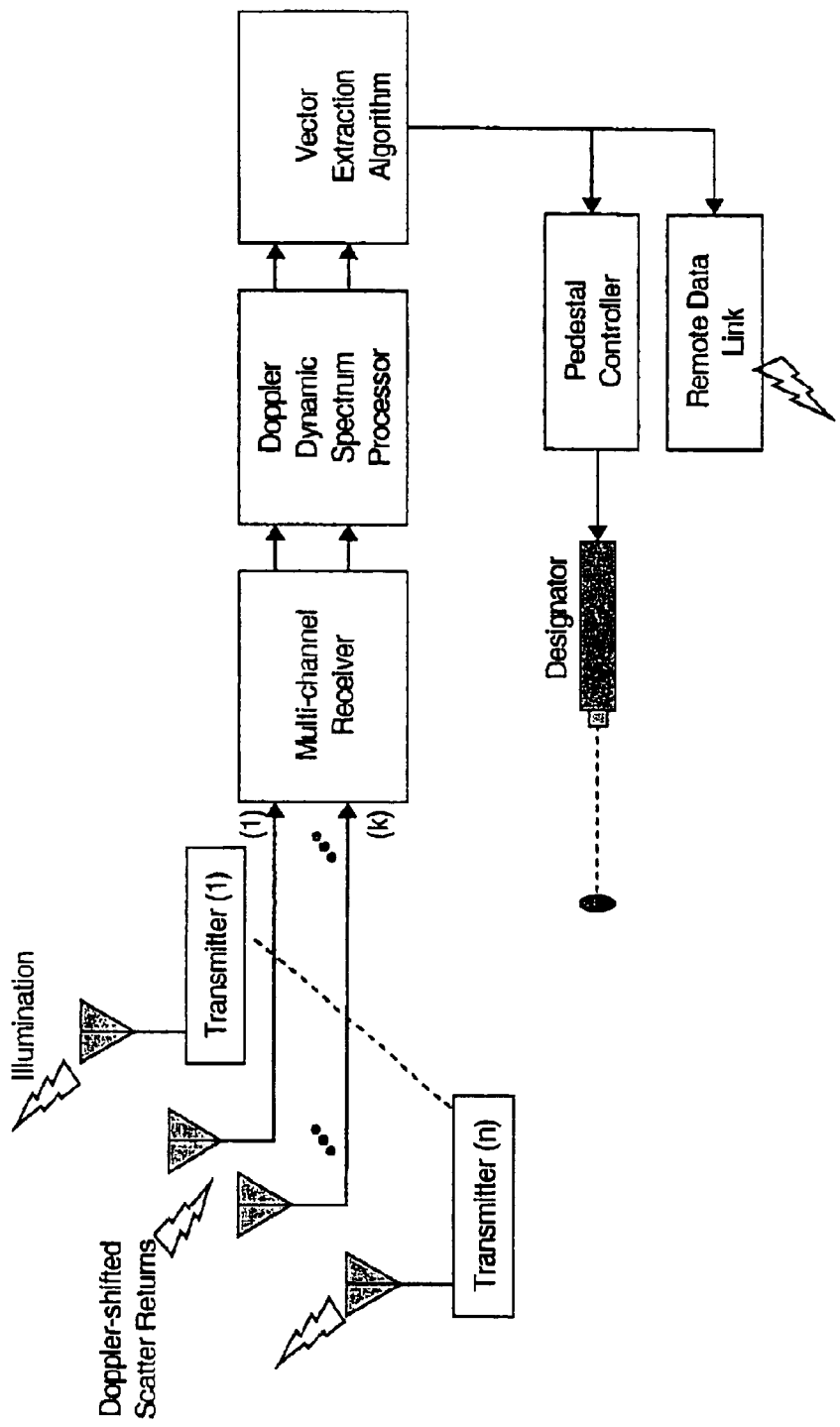
FIG. 6 illustrates a typical system block diagram for implementing the is closed approach.

The previous algorithm description provides a framework for developing an estimate of the projectile velocity parameters given a set of Doppler f-t histories acquired using multiple transmitters and receivers. An area of ongoing investigation is the refinement of algorithm efficiencies and design tradeoffs driven by specific throughput and accuracy requirements. In addition, the extension of the sensor architecture and algorithms to support extraction of 3D projectile vectors can be highly desirable for some applications. FIG. 6 illustrates a typical system block diagram for implementing the disclosed approach.

I claim:

1. A system for deriving the flight path of a projectile, comprising:
    a source of radio-frequency (RF) energy directed into a region including the flight path;
    one or more RF receivers for receiving energy reflected by the projectile as it travels along the flight path; and
    a processor interconnected to the RF receivers for generating a Doppler time-frequency profile of the flight path and a three-dimensional projectile flight vector.

2. The system of claim 1, wherein the RF sources operate in a continuous-wave (CW) mode.

3. The system of claim 1, further including an indicator used to identify the source of the projectile as a function of the projectile flight vector.

4. The system of claim 1, further including a laser beam indicator used to illuminate the source of the projectile as a function of the projectile flight vector.

5. The system of claim 1, further including an interface to a map enabling the geographic source of the projectile to be displayed as a function of the projectile flight vector.

6. The system of claim 1, including two or more RF sources operating at different frequencies.

7. The system of claim 1, wherein the RF source and a receiver are physically offset.

8. The system of claim 1, including two or more co-located source-receiver pairs, each pair being physically offset.

9. The system of claim 1, wherein the processor uses a time history of the Doppler time-frequency profile.

10. The system of claim 1, wherein the processor takes the effect of air friction on the projectile into account when generating the time-frequency profile.

11. The system of claim 1, wherein the processor relies on narrowband Doppler signatures.

12. The system of claim 1, wherein the processor uses a Doppler passband that is intentionally spaced apart from the carrier frequency of the source.

13. The system of claim 1, wherein the source and receivers operate in the ultra-high frequency band.

14. The system of claim 1, wherein the source and receivers use linear polarization.

15. A method of deriving the flight path of a projectile, comprising the steps of:
- transmitting radio-frequency (RF) energy into a region including the flight path;
- receiving energy reflected by the projectile as it travels along the flight path; and
- generating a Doppler time-frequency profile of the flight path and a three-dimensional projectile flight vector.

16. The method of claim 15, wherein the RF sources operate in a continuous-wave (CW) mode.

17. The method of claim 15, further including the step of identifying the source of the projectile as a function of the projectile flight vector.

18. The method of claim 15, further including the step of using a laser beam to illuminate the source of the projectile as a function of the projectile flight vector.

19. The method of claim 15, further including the step displaying the flight path on a map.

20. The method of claim 15, including the step of operating two or more RF sources at different frequencies.

21. The method of claim 15, including the step of physically separating the RF source and a receiver.

22. The method of claim 15, including the step of co-locating two or more source-receiver pairs, each pair being physically offset.

23. The method of claim 15, further including the step of using a time history of the Doppler time-frequency profile.

24. The method of claim 15, further including the step of taking the effect of air friction on the projectile into account when computing the flight path.

25. The method of claim 15, further including the step of using narrowband Doppler signatures.

26. The method of claim 15, further including the step of using a Doppler passband that is intentionally spaced apart from the carrier frequency of the source.

27. The method of claim 15, further including the step of operating the source and receivers in the ultra-high frequency band.

28. The method of claim 15, wherein the source and receivers use linear polarization.

29. A system for deriving the flight path of a projectile, comprising:
- a plurality of continuous-wave (CW) radio-frequency (RF) transmitters, each directing energy at a different carrier frequency into a region of overlap including the flight path;
- one or more RF receivers for receiving energy reflected by the projectile as it travels along the flight path; and
- a processor interconnected to the RF receivers for generating a Doppler time-frequency profile and time history of the flight path to determine a multi-dimensional projectile flight vector.

30. The system of claim 29, further including an indicator used to identify the source of the projectile as a function of the projectile flight vector.

31. The system of claim 29, further including a laser beam indicator used to illuminate the source of the projectile as a function of the projectile flight vector.

32. The system of claim 29, further including an interface to a map enabling the geographic source of the projectile to be displayed as a function of the projectile flight vector.

33. The system of claim 29, wherein the RF source and a receiver are physically offset.

34. The system of claim 29, including two or more co-located source-receiver pairs, each pair being physically offset.

35. The system of claim 29, wherein the processor takes the effect of air friction on the projectile into account when generating the time-frequency profile.

36. The system of claim 29, wherein the processor relies on narrowband Doppler signatures.

37. The system of claim 29, wherein the processor uses a Doppler passband that is intentionally spaced apart from the carrier frequency of the source.

38. The system of claim 29, wherein the source and receivers operate in the ultra-high frequency band.

39. The system of claim 29, wherein the source and receivers use linear polarization.

* * * * *